(12) United States Patent
O'Farrell et al.

(10) Patent No.: US 7,845,068 B2
(45) Date of Patent: Dec. 7, 2010

(54) METHOD FOR ASSEMBLING A CARRIER FOR INTEGRATED CIRCUITS

(75) Inventors: Stephen Richard O'Farrell, Balmain (AU); Jan Waszczuk, Balmain (AU); David Bernardi, Balmain (AU); Toby Desmond Oste, Balmain (AU); Mark Janos, Balmain (AU); William Granger, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 290 days.

(21) Appl. No.: 12/193,738

(22) Filed: Aug. 19, 2008

(65) Prior Publication Data

US 2010/0045741 A1    Feb. 25, 2010

(51) Int. Cl.
*B23P 19/00* (2006.01)
(52) U.S. Cl. .......................................... 29/729
(58) Field of Classification Search .................. 29/729, 29/806, 809, 760, 81.08, 740, 714, 592.1
See application file for complete search history.

(56) References Cited

U.S. PATENT DOCUMENTS 5,864,943 A * 2/1999 Arakawa et al. ............... 29/740
6,009,617 A * 1/2000 Fan ............................. 29/714

* cited by examiner

*Primary Examiner*—Lamson D Nguyen (57) ABSTRACT

The invention relates to a method for assembling a carrier for integrated circuits. The carrier has upper and lower parts. The method includes the steps of positioning the lower part in a bottom clamp portion retained in a bottom clamp receptacle, positioning a top clamp portion in a top clamp receptacle, the clamp portions being configured to engage each other in a locking manner, and positioning the upper part in a first gripper. The method also features the steps of applying adhesive to at least one of the parts, pressing said upper part onto the bottom part retained by the bottom clamp receptacle with the first gripper, whilst retrieving the top clamp portion with a second gripper, and locking the top clamp portion to the bottom clamp portion with the second gripper to clamp the parts together.

6 Claims, 11 Drawing Sheets

METHOD FOR ASSEMBLING A CARRIER FOR INTEGRATED CIRCUITS

FIELD OF THE INVENTION

The invention relates to an assembler for assembling a carrier for supporting printhead integrated circuits, a method for assembling a carrier for integrated circuits, a safety system for an assembling apparatus for assembling a circuitry test support, a carriage assembly for use with an assembling apparatus of an integrated circuit carrier, and an adhesive application apparatus for use with an assembling machine for assembling a carrier for printhead integrated circuits.

CO-PENDING APPLICATIONS

The following applications have been filed by the Applicant simultaneously with the present application:

| | | | | | | |
|---|---|---|---|---|---|---|
| MPN023US | MPN024US | MPN025US | MPN026US | MPN027US | MPN028US | MPN029US |
| MPN030US | MPN031US | MPN032US | MPN033US | MPN034US | MPN035US | MPN036US |
| MPN037US | MPN038US | MPN039US | MPN041US | MPN042US | MPN043US | MPN046US |
| MPN047US | MPN048US | MPN051US | MPN052US | MPN053US | MPN054US | MPN055US |
| MPN056US | MPN057US | MPN058US | MPN059US | MPN060US | MPN061US | |

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | |
|---|---|---|---|---|---|
| 11/246,687 | 11/246,718 | 7,322,681 | 11/246,686 | 11/246,703 | 11/246,691 11/246,711 |
| 11/246,690 | 11/246,712 | 11/246,717 | 7,401,890 | 7,401,910 | 11/246,701 11/246,702 |
| 11/246,668 | 11/246,697 | 11/246,698 | 11/246,699 | 11/246,675 | 11/246,674 11/246,667 |
| 11/829,957 | 11/829,960 | 11/829,961 | 11/829,962 | 11/829,963 | 11/829,966 11/829,967 |
| 11/829,968 | 11/829,969 | 11,946,839 | 11,946,838 | 11,946,837 | 11,951,230 12,141,034 |
| 12,140,265 | 12,183,003 | 11/688,863 | 11/688,864 | 11/688,865 | 7,364,265 11/688,867 |
| 11/688,868 | 11/688,869 | 11/688,871 | 11/688,872 | 11/688,873 | 11/741,766 12,014,767 |
| 12,014,768 | 12,014,769 | 12,014,770 | 12,014,771 | 12,014,772 | 12,014,773 12,014,774 |
| 12,014,775 | 12,014,776 | 12,014,777 | 12,014,778 | 12,014,779 | 12,014,780 12,014,781 |
| 12,014,782 | 12,014,783 | 12,014,784 | 12,014,785 | 12,014,787 | 12,014,788 12,014,789 |
| 12,014,790 | 12,014,791 | 12,014,792 | 12,014,793 | 12,014,794 | 12,014,796 12,014,798 |
| 12,014,801 | 12,014,803 | 12,014,804 | 12,014,805 | 12,014,806 | 12,014,807 12,049,371 |
| 12,049,372 | 12,049,373 | 12,049,374 | 12,049,375 | 12,103,674 | 12,146,399 |

BACKGROUND OF THE INVENTION

Pagewidth printers that incorporate micro-electromechanical components generally have printhead integrated circuits that include a silicon substrate with a large number of densely arranged micro-electromechanical nozzle arrangements. Each nozzle arrangement is responsible for ejecting a stream of ink drops.

In order for such printers to print accurately and maintain quality, it is important that the printhead integrated circuits be tested. This is particularly important during the design and development of such integrated circuits.

Some form of carrier is generally required for testing such integrated circuits.

SUMMARY OF THE INVENTION

According to one aspect of the invention there is provided an assembler for assembling a carrier for supporting printhead integrated circuits, said carrier having upper and lower parts that are operatively fastened together, said assembler comprising:

a support structure configured to support the lower part in a pre-fastened position;

a holding mechanism arranged on the support structure for holding the upper part in a pre-fastened position;

a displacement mechanism arranged on the support structure for displacing the holding mechanisms to bring the parts into operative registration with each other; and a fastening apparatus for fastening the parts together.

The support structure may include a support bed and a carriage assembly positioned on the support bed, the displacement and holding mechanisms being arranged on the carriage assembly.

The carriage assembly may have a linear carriage spaced from the support bed and carriage actuators for linear displacement of the holding mechanisms with respect to the support bed.

The fastening apparatus may include an operatively lower clamp and an operatively upper clamp, the clamps being configured to correspond with the lower part and the upper part respectively to clamp the parts together, the support bed being configured to support the lower clamp in a pre-clamped position.

The fastening apparatus may include an upper clamp lifting and holding mechanism arranged on the carriage assembly and configured to lift the upper clamp from the support bed and to bring it into operative engagement with the lower clamp.

The fastening apparatus may include an adhesive dispenser arranged on the support structure and configured to dispense an adhesive to be applied to one of the parts.

The fastening apparatus may include an adhesive applicator positioned on the support bed to receive adhesive dispensed by the dispenser, the displacement mechanism being configured to displace the upper part into engagement with the applicator prior to positioning the upper part on the lower part.

The upper clamp lifting and holding mechanism may be configured to bring the upper clamp into operative engagement with the lower clamp subsequent to positioning the upper part on the lower part.

According to a second aspect of the invention, there is provided a method for assembling a carrier for integrated circuits, said carrier having upper and lower parts, the method comprising the steps of:

positioning the lower part in a bottom clamp portion retained in a bottom clamp receptacle;

positioning a top clamp portion in a top clamp receptacle, the clamp portions being configured to engage each other in a locking manner;

positioning the upper part in a first gripper;

applying adhesive to at least one of the parts;

pressing said upper part onto the bottom part retained by the bottom clamp receptacle with the first gripper, whilst retrieving the top clamp portion with a second gripper; and locking the top clamp portion to the bottom clamp portion with the second gripper to clamp the parts together.

The step of positioning the carrier parts may include positioning carrier parts molded from a liquid crystal polymer (LCP). The step of positioning the carrier parts may include receiving carrier parts which define a plurality of discrete fluid paths when operatively joined to form a fluid supply carrier for the printhead circuitry.

The step of applying adhesive may include dispensing the adhesive with an adhesive dispenser onto a surface and dipping at least part of the gripped upper part in such dispensed adhesive with said first gripper.

The method may be carried out with an apparatus that defines a single-user station and including the step of monitoring an operational status of the apparatus.

The method may include the step of reading identifiers on the carrier parts and relaying data representing the identifiers to a control system of the apparatus.

According to a third aspect of the invention there is provided a safety system for an assembling apparatus for assembling a circuitry test support having a number of components to be fastened together, the apparatus having moveable mechanisms displaceable within an operating zone, the system comprising:

a sensor arrangement for sensing an operational status of the assembler;

an emergency cut-off mechanism operatively connected to the sensor arrangement and configured to deactivate the assembler when an undesired operational status is sensed; and a control system for controlling operation of the sensor arrangement and the emergency cut-off mechanism.

The control system may be configured such that the operational status includes aspects selected from the group consisting of: a position of the movable mechanisms; a presence of a foreign object proximate the movable mechanisms; a fluid pressure of hydraulic or pneumatic actuators of the movable mechanisms; a presence of the components; authenticity of the components; an electricity supply to the assembler; and an operator identifier of an operator operating the assembler.

Accordingly, the sensor arrangement may include a plurality of micro-switches for sensing positions of the movable mechanisms. The sensor arrangement may include a light curtain connected to the control system to detect the ingress of a foreign object into the operating zone, a pressure sensor connected to the control system to detect a fluid pressure of hydraulic or pneumatic actuators for the movable mechanisms and proximity sensors connected to the control system to detect a position of the components.

The sensor arrangement may include a barcode scanner connected to the control system and operable to scan a barcode of the components to enable verification of the authenticity of the components by the control system.

The control system may be configured to communicate with a remote monitoring system.

According to a fourth aspect of the invention, there is provided a carriage assembly for use with an assembling apparatus used to assemble operatively upper and lower portions of an integrated circuits carrier with co-operative upper and lower clamping members, the carriage assembly comprising:

a linear carriageway in a working zone of the assembling apparatus and spaced from a support surface of the apparatus;

a first holding mechanism movable along the linear carriageway and configured to hold the upper carrier portion and to displace said upper portion substantially orthogonally with respect to said linear carriageway towards and away from a support surface of the assembling apparatus;

a second holding mechanism movable along the linear carriage and configured to hold the upper clamping member and to displace the upper clamping member towards and away from the support surface;

a linear actuator configured to displace the holding mechanisms along the carriageway; and a control system to control operation of the holding mechanisms and the linear actuator.

The control system may be configured to displace the first holding mechanism through an operative cycle that includes a first step towards the support surface, a second step away from the support surface, a third step along the carriageway, a fourth step towards the support surface and a fifth step away from the support surface.

The control system may be configured to displace the second holding mechanism through an operative cycle that includes a first step along the carriageway, a second step towards the support surface, a third step away from the support surface, a fourth step along the carriageway in a direction opposite to the first step, a fifth step back towards the support surface and a sixth step away from the support surface.

The first and second holding mechanisms may be fast with each other such that the third step of the first holding mechanism is simultaneous with the first step of the second holding mechanism.

The control system may be configured to displace the first holding mechanism such that the upper portion is brought into and out of operative engagement with an adhesive station on the support surface in the first and second steps, into alignment with the lower portion positioned in the lower clamp member on the support surface in the third step and into adhesive engagement with the lower portion in the fourth step.

The control system may be configured to displace the second holding mechanism into alignment with the upper clamp member in the first step, into engagement with the upper clamp member in the second step, away from the support surface, with the upper clamp member, in the third step, into alignment with the upper portion in the fourth step, to engage the upper clamp member with the lower clamp member in the fifth and to disengage from the upper clamp member in the sixth step.

According to a fifth aspect of the invention, there is provided an adhesive application apparatus for use with an assembling machine for assembling operatively upper and lower components for carrying printhead integrated circuits, the application apparatus comprising:

a plate;

a dispensing mechanism which includes an adhesive reservoir, said mechanism being operatively engaged with said plate in a sealing and sliding manner, the mechanism configured to dispense adhesive onto the plate when sliding along the plate;

a displacement mechanism to slide the dispensing mechanism along the plate; and a control system to control operation of the dispensing and displacement mechanisms.

The dispensing mechanism may be configured to dispense adhesive according to a pad printing technique. The plate may define an etched channel shaped and dimensioned according to the upper component, so that a particular part of the upper component is covered in adhesive when the portion is placed on the plate.

The displacement mechanism may include a linear carriage and actuator engaged with the dispensing mechanism. The dispensing mechanism may include a dispensing cup in which adhesive is stored, the dispensing cup being magnetically attracted to the plate to generate said operative engagement.

According to a sixth aspect of the invention, there is provided a software product for execution by a processor of an assembler for assembling a carrier operatively supporting a printhead integrated circuit, said software product enabling the processor to perform the steps of:

positioning a lower carrier part in a bottom clamp portion retained in a bottom clamp receptacle;

positioning a top clamp portion in a top clamp receptacle, the clamp portions being configured to engage each other in a locking manner;

positioning an upper carrier part in a first gripper;

applying adhesive to at least one of the parts;

pressing said upper part onto the bottom part retained by the bottom clamp receptacle with the first gripper, whilst retrieving the top clamp portion with a second gripper; and locking the top clamp portion to the bottom clamp portion with the second gripper to clamp the parts together.

According to a seventh aspect of the invention, there is provided memory comprising a software product for execution by a processor of an assembler for assembling a carrier operatively supporting a printhead integrated circuit, said software product enabling the processor to perform the steps of:

positioning a lower carrier part in a bottom clamp portion retained in a bottom clamp receptacle;

positioning a top clamp portion in a top clamp receptacle, the clamp portions being configured to engage each other in a locking manner;

positioning an upper carrier part in a first gripper;

applying adhesive to at least one of the parts;

pressing said upper part onto the bottom part retained by the bottom clamp receptacle with the first gripper, whilst retrieving the top clamp portion with a second gripper; and locking the top clamp portion to the bottom clamp portion with the second gripper to clamp the parts together.

The invention is now described, by way of example, with reference to the accompanying drawings. The following description is intended to illustrate particular embodiments of the invention and to permit a person skilled in the art to put those embodiments of the invention into effect. Accordingly, the following description is not intended to limit the scope of the preceding paragraphs or the claims in any way.

BRIEF DESCRIPTION OF THE DRAWINGS

In the drawings:

FIG. 8.1 shows electrical and pneumatic components in an enclosure for the assembler of claim 1;

FIG. 8.2 shows a side view of the enclosure of FIG. 8.1, showing external connections for the electrical and pneumatic components;

DETAILED DESCRIPTION OF THE INVENTION

With reference to the accompanying drawings, reference numeral 10 generally refers to an assembler or assembling machine for assembling a carrier for supporting printhead integrated circuits, in accordance with the invention. Throughout this description, like reference numerals indicate like components, unless otherwise specified.

Figure 1:
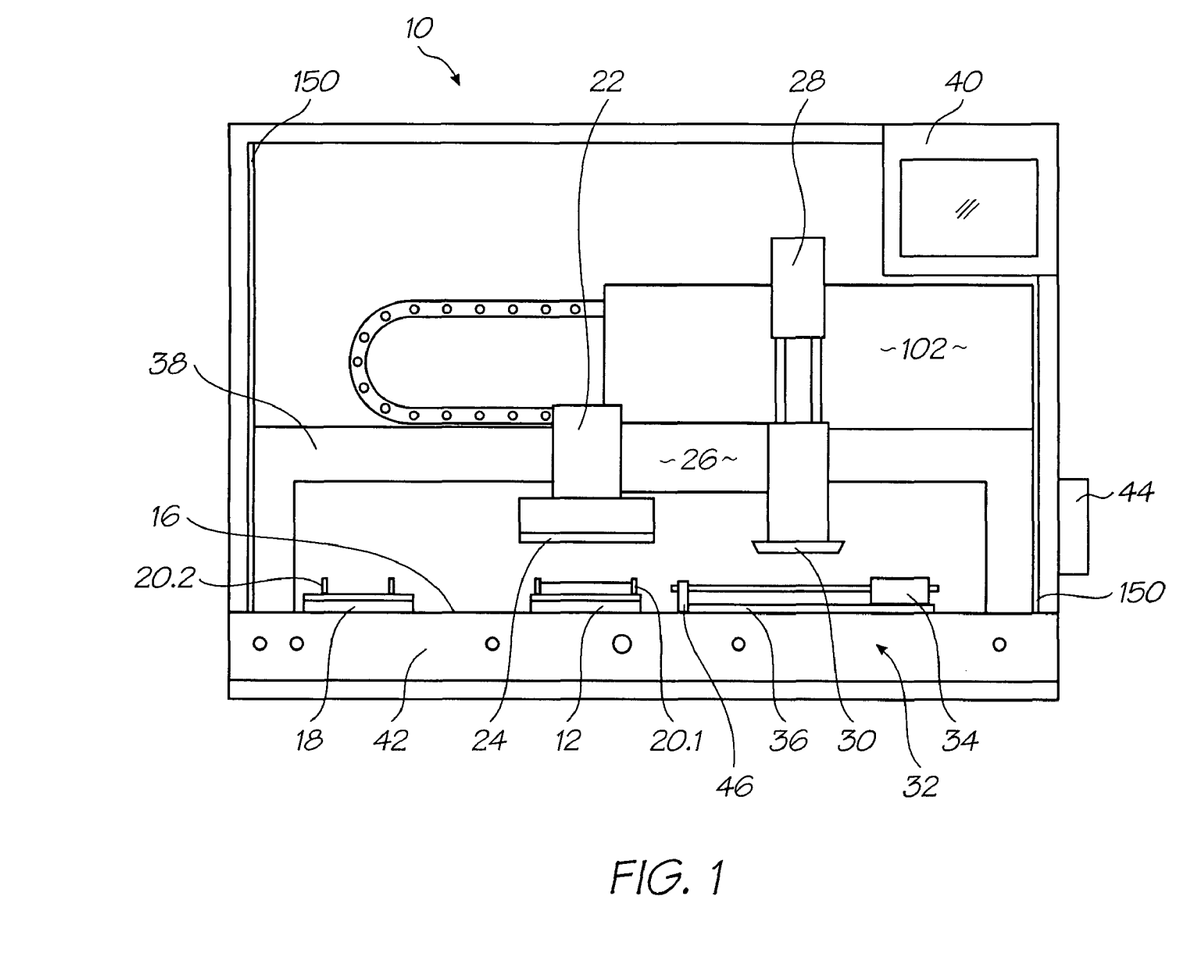
FIG. 1 shows a frontal layout view of an embodiment, in accordance with the invention, of an assembler for a carrier for supporting printhead integrated circuits.

Referring now to FIG. 1, one embodiment of the assembler 10 is shown in broad overview. In the embodiment shown, the assembler 10 is a single-user workstation-type machine for assembling a carrier 14, which is also a carrier for integrated circuits (see FIG. 4). The assembler 10 includes a frame or support structure 16 which houses the necessary components, as described below.

Figure 4:
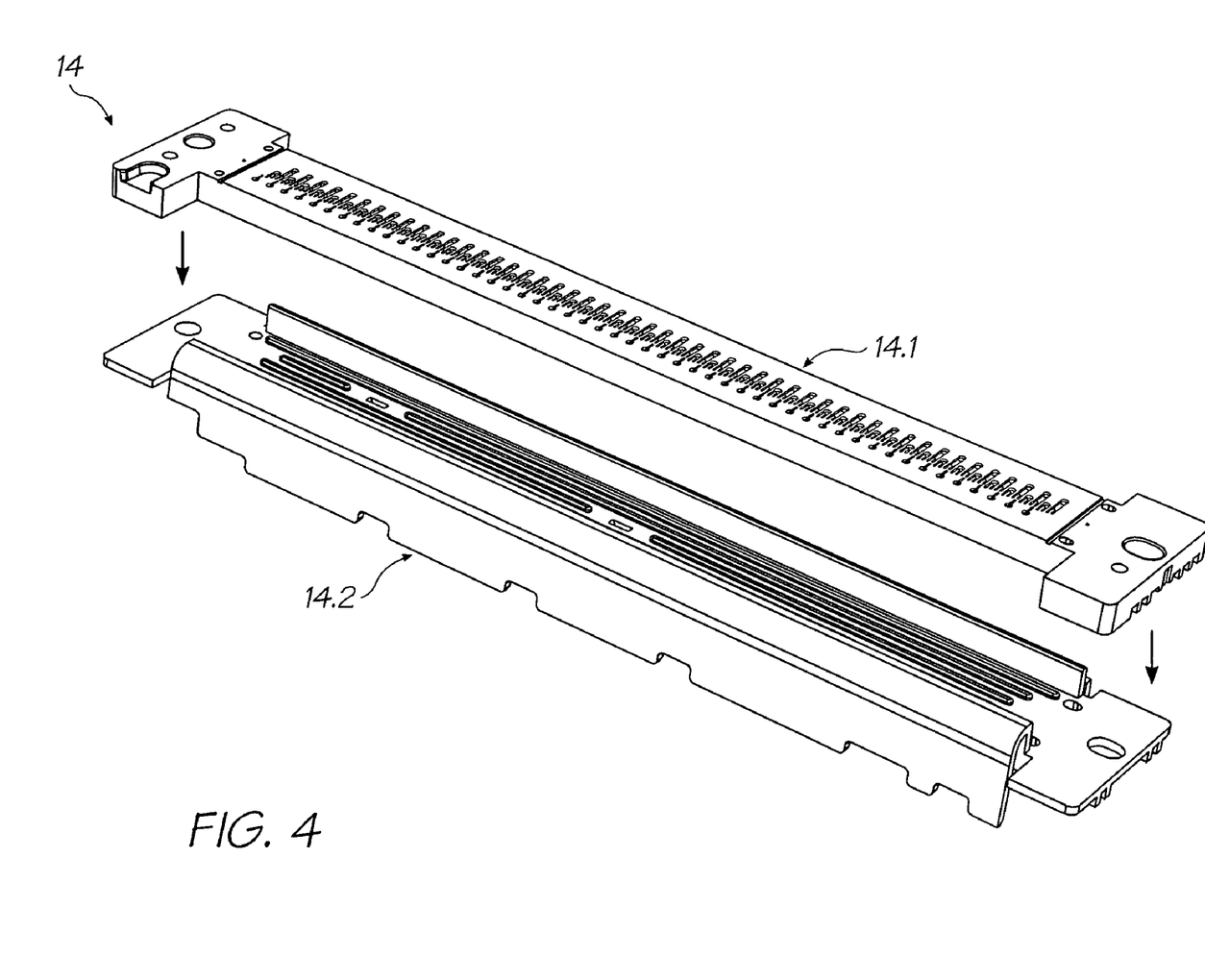
FIG. 4 shows an exploded perspective view of the upper part and a lower carrier part of the carrier for supporting printhead integrated circuits.

With reference to FIG. 4, the assembler 10 is used to assemble a carrier 14 for printhead circuitry. The carrier 14 comprises an upper part 14.1 and a lower part 14.2. The carrier parts 14.1 and 14.2 are typically molded from a liquid crystal polymer to define a plurality of tortuous printing fluid paths therein. The carrier 14 is used to mount printhead integrated circuits (not shown) for testing purposes.

The printhead integrated circuits is generally formed from micro-electromechanical systems (MEMS) manufacturing techniques and comprises a number of nozzle arrangements for operatively ejecting printing fluids onto a medium. However, prior to installing the printhead circuitry into a printer, it is important to test the circuitry to ensure acceptable levels of operation. The carrier 14 is used as a conduit for the supply of printing fluids to the printhead circuitry.

Figure 9:
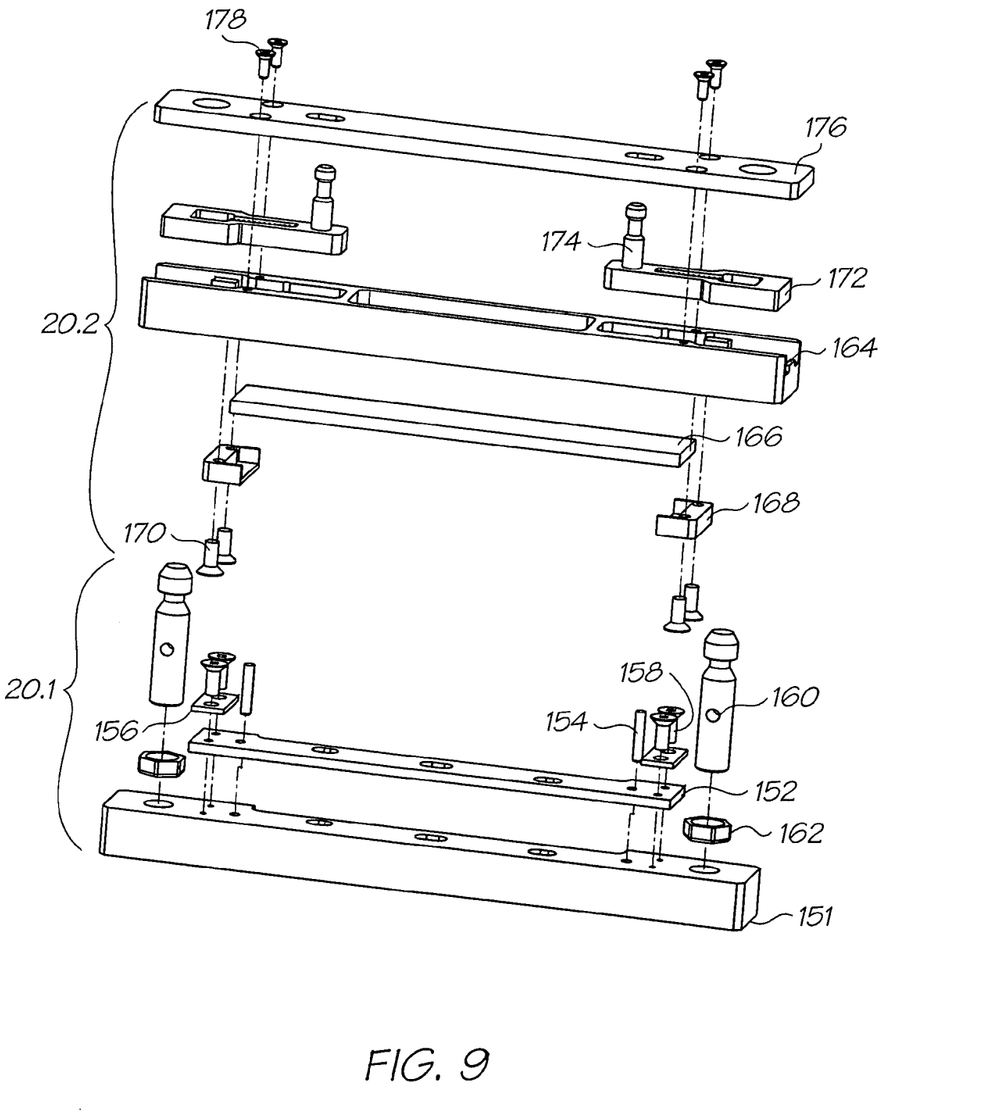
FIG. 9 shows an exploded detailed view of a fastening apparatus of the assembler of FIG. 1 for fastening the upper and lower carrier parts together.

As shown in FIG. 4, the carrier 14 has an upper part 14.1 onto which the circuitry is placed in operation. The upper part 14.1 defines a number of openings for ducting printing fluid to similar openings of the circuitry. The lower carrier part 14.2 defines a number of channels which form the fluid paths when the two parts 14.1 and 14.2 are bonded together. The assembler 10 is used to bond these parts together. The assembler 10 uses a fastening apparatus in the form of a clamp assembly 20, described below.

Referring now to FIG. 1, the assembler 10 includes the support bed 16 which locates a lower clamp receptacle or nest 12 and an upper clamp receptacle or nest 18. A carriage assembly 26 is supported on the support bed and has a linear carriage defined by a rail 38 which supports, in a linearly displaceable manner, a first holding mechanism 22 and a second holding or displacement mechanism 28, both linked and driven by a linear actuator to be displaceable together along the rail 38.

The first holding mechanism 22 includes a first gripper 24, and the displacement mechanism 28 includes a second gripper 30. In use, an operator (not shown) is responsible for loading the assembler 10 with four components, namely a lower clamp 20.1, an upper clamp 20.2, the upper carrier part 14.1 and the lower carrier part 14.2. The clamp assembly 20 is shown in more detail in FIG. 9 discussed below.

In use, the operator loads the lower clamp 20.1 into the lower clamp nest 12, and places the lower carrier part 14.2 into the lower clamp 20.1. The upper carrier part 14.1 is placed into the first gripper 24 of the holding mechanism 22, and the upper clamp 20.2 is placed into the top clamp nest 18.

The assembler 10 also includes an adhesive application apparatus having a glue dispenser apparatus 32. The glue dispenser apparatus includes a dispensing mechanism 34, a displacement mechanism 46, and an etched plate 36. The dispensing mechanism 34 is configured to dispense an adhesive onto the etched plate 36. The etched plate 36 functions as an applicator when a carrier part 14 is brought into contact with the plate 36.

The assembler 10 further includes a control system or controller having an operator interface in the form of a panel 42 and a touch-screen display 40. The operator interface is used to permit an operator to control operation of the assembler 10. The control system also has a barcode scanner 44, which is used to scan identifiers in the form of barcodes from the clamp and carrier parts.

During operation of the assembler 10 and after the respective parts have been loaded into the different clamp nests and grippers, as described above, the process is as follows. Upon activation of the assembler 10 via the operator interface, the mechanisms 22 and 28 are positioned as shown in FIG. 1. The glue dispenser 32 is activated so that the dispensing mechanism 34 is displaced across the etched plate 36 by the displacement mechanism 46, dispensing glue over the plate 36. The displacement mechanism 28 then lowers the second gripper 30, which grips the upper carrier part 14.1 (FIG. 4), onto the etched plate 36.

The etched plate 36 has adhesive spread thereon by the action of the dispensing mechanism 34, so that dipping the upper carrier part 14.1 therein coats a bottom surface of the carrier part 14.1 with adhesive. The second gripper 30 then raises the carrier part 14.1, whereafter the displacement mechanism 28 is displaced along the rail 38 so that the second gripper 30 can place the upper carrier part 14.1 onto the lower carrier part 14.2. When the first holding and the displacement mechanisms 22, 28 are in a predetermined position, the first gripper 24 and the second gripper 30 are lowered simultaneously.

The first gripper 24 retrieves the top clamp 20.2 from the top clamp nest 18, whilst the second gripper 30 presses the upper carrier part 14.1 onto the lower part 14.2 which is held by the bottom clamp in the lower clamp nest 12. Thereafter both grippers 24 and 30 are retracted upwards towards the rail 38, and the first holding and displacement mechanisms 22, 28 are moved so that the first gripper 24 is above the lower clamp nest 12. Once in position, the first gripper 24 locks the top clamp 20.2 to the lower clamp 20.1, so that the carrier parts 14 are clamped together. This clamped assembly may then be subjected to a heat curing process, or the like.

Prior to the operator loading the parts into their respective grippers and/or clamp nests, the parts 14 and clamps 20 can be scanned with the barcode scanner 44. The barcode scanner 44 is in signal communication with the control system or controller of the assembler 10, which can be configured to log and keep track of discrete clamps and parts.

Figure 2:
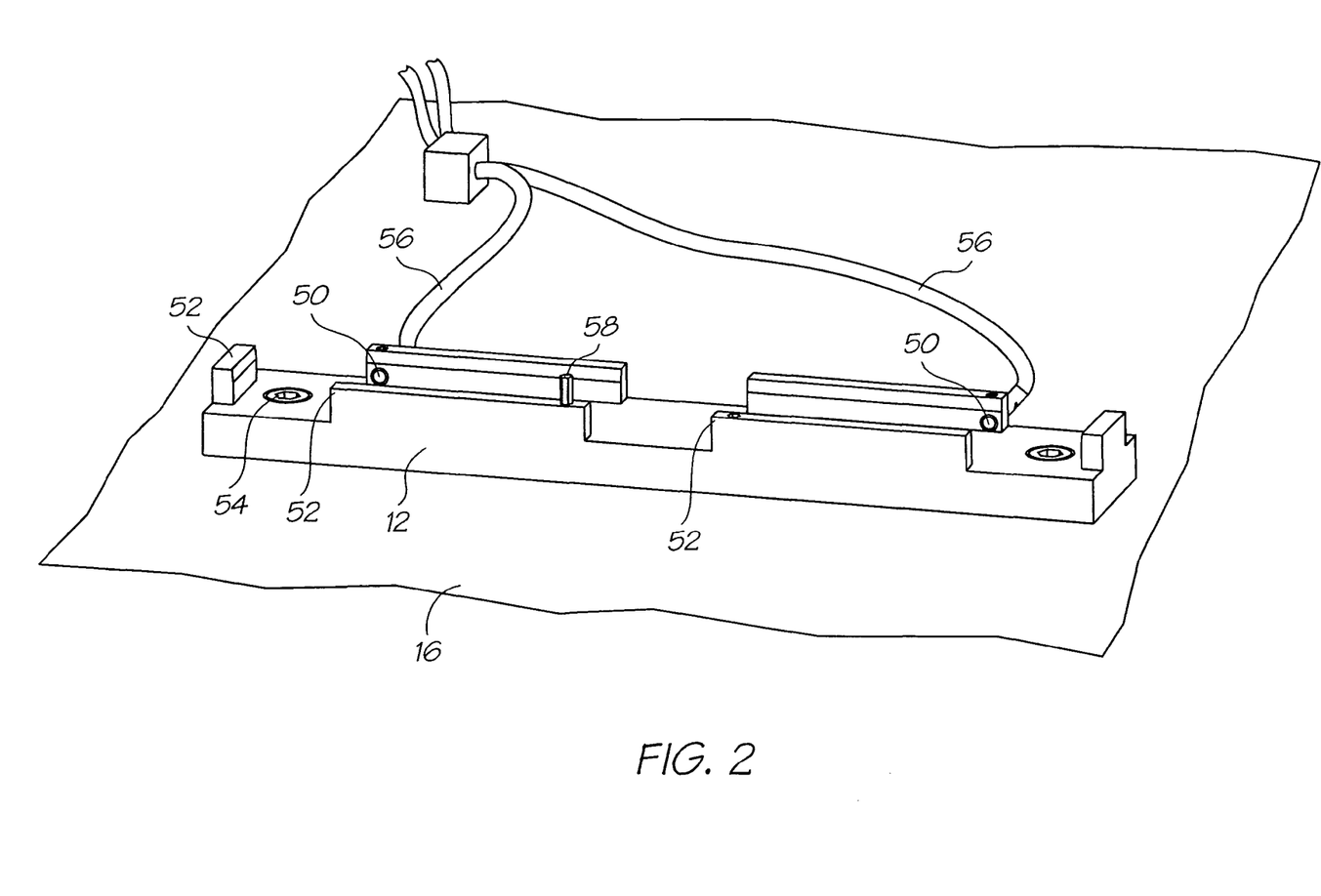
FIG. 2 shows a perspective view of a holding mechanism for an upper carrier part of the assembler of FIG. 1.

FIG. 2 shows a more detailed view of the lower clamp nest 12. The nest 12 is affixed to the supporting bed of the structure 16 by means of fasteners 54. In the embodiment shown, these fasteners are Allen screws, but any suitable fastener may be used. The nest 12 includes locating tabs 52 to locate the lower clamp 20.1 therein, as well as proximity sensors 50 to sense when the clamp is correctly positioned and secured. In one embodiment the sensors 50 are short-barrel inductive proximity sensors. The sensors 50 are linked to the controller by means of wires 56, as shown.

The Inventor has found that pre-wired miniature sensors from the Omron™ E2E range are suitable for the sensors 50. The nest 12 also includes an orientation spigot 58 for complementarily engaging a corresponding aperture in the lower clamp 20.2 to ensure that the clamp is correctly in position.

Figure 3:
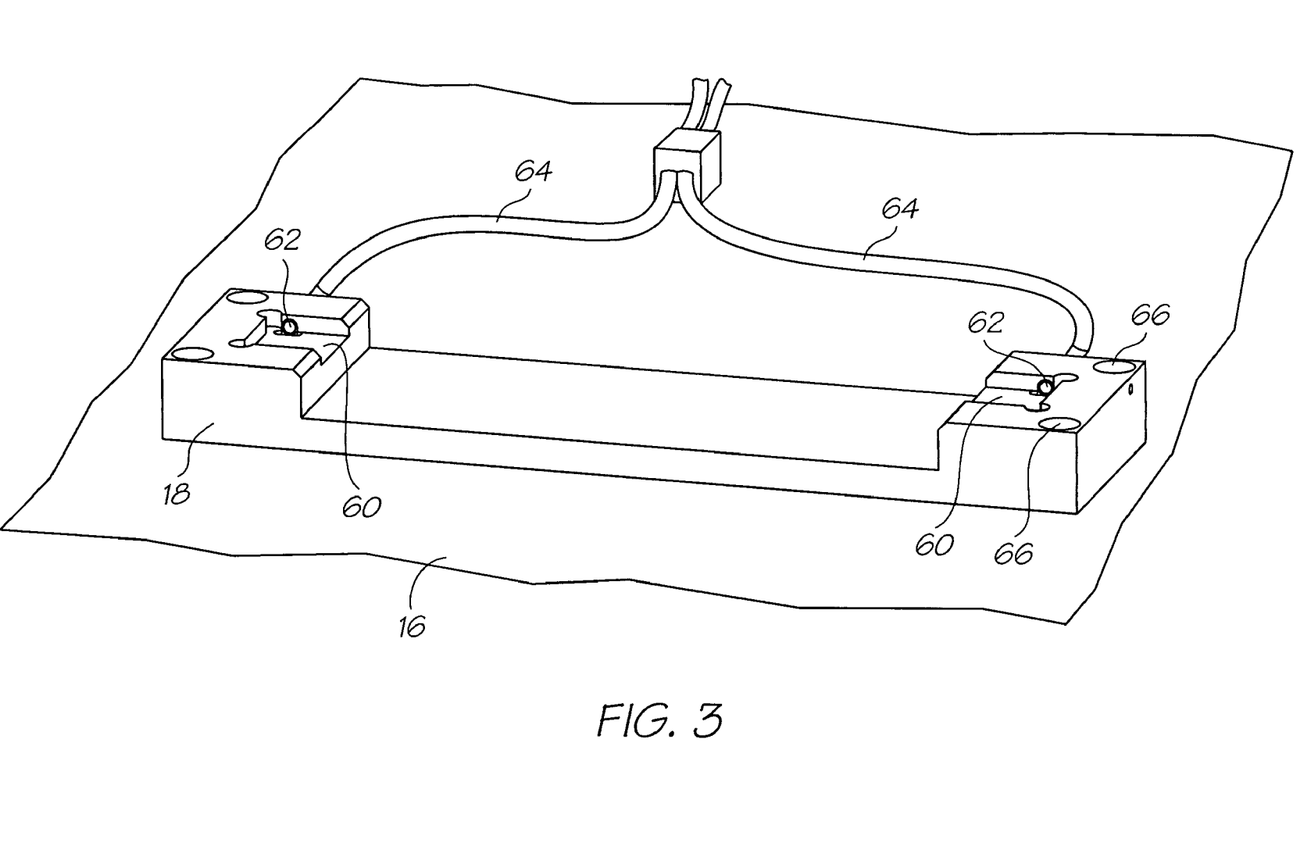
FIG. 3 shows a perspective view of a holding mechanism for an upper clamp of the assembler of FIG. 1.

FIG. 3 shows a more detailed view of the top clamp nest 18. The nest 18 is fastened to the support bed 16 with fasteners 66. In the embodiment shown, the fasteners are Allen screws, but any suitable fastener may be used. The nest 18 defines locating channels 60 for receiving the top clamp 20.2. The channels 60 include proximity sensors 62 linked to the controller by wires 64. The sensors 62 are used to sense when the top clamp is correctly in position. As above, the Inventor has found that pre-wired miniature sensors from the Omron™ E2E range are suitable for sensors 62.

It is to be appreciated that sensors 50 and 62 are linked to the controller so that operation of the assembler 10 can be interrupted if the clamps are removed from the nests 12 and 18. For example, should the top clamp 20.2 be accidentally or erroneously removed during operation, a safety system of the assembler (described in more detail below) may interrupt the assembler to prevent damage to components and/or injury to the operator.

Figure 5:
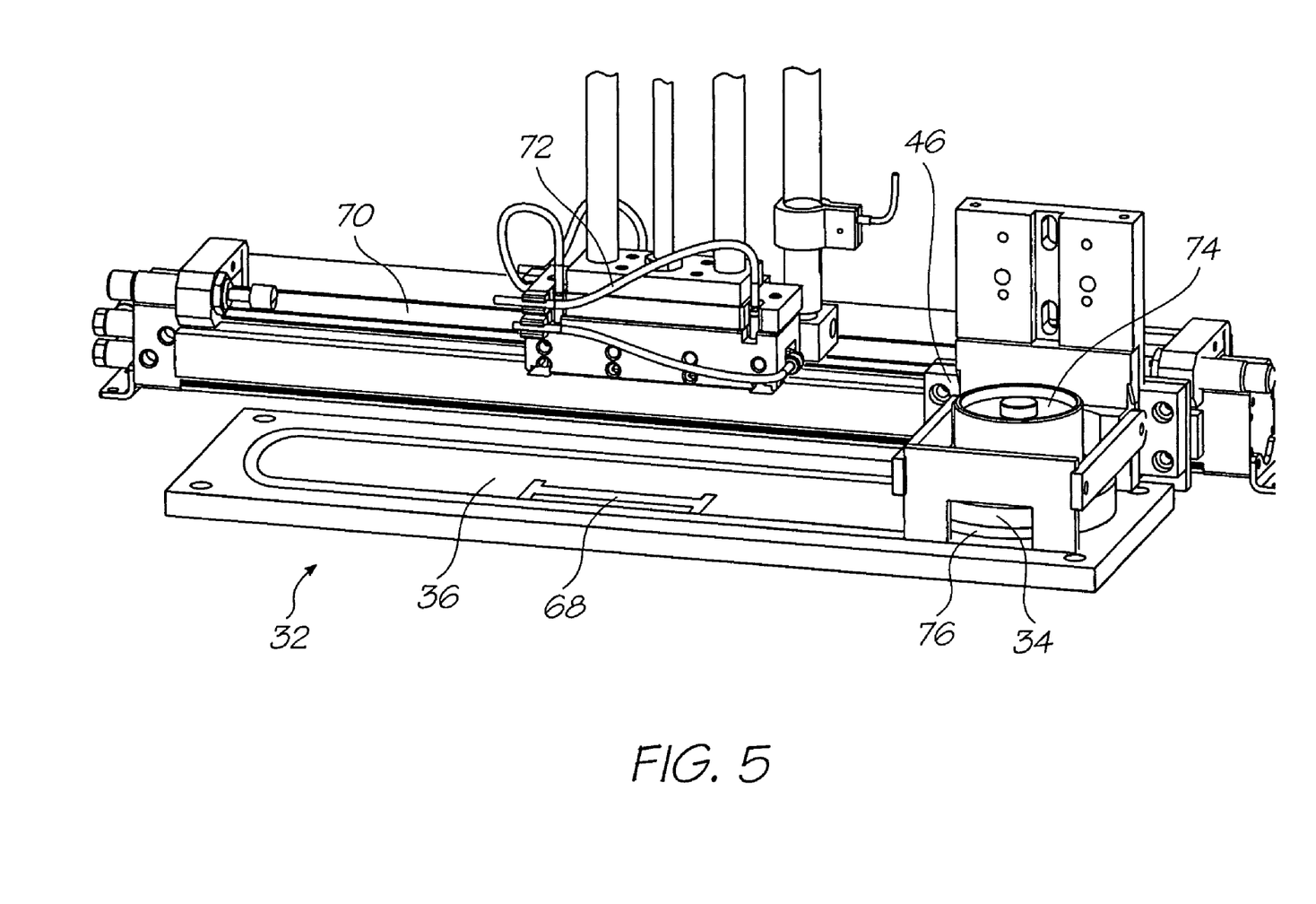
FIG. 5 shows a perspective view of an embodiment, in accordance with the invention, of an adhesive application apparatus for use with an assembling machine for assembling operatively upper and lower components for carrying printhead integrated circuits, which can be the assembler of FIG. 1.

The adhesive dispenser apparatus 32 is shown in more detail in FIG. 5. As shown, the apparatus 32 comprises a dispensing mechanism 34 in the form of a glue cup or adhesive reservoir 34 with an accompanying glue cup lid 74 which is removable for refilling said cup with adhesive. The glue cup 34 also includes a sealing member 76 which provides a reduced friction surface to facilitate displacement of the glue cup 34 across the etched plate 36.

The dispensing mechanism 34 is configured to dispense the adhesive according to a pad printing technique. The glue cup 34 is displaced across the plate 36 by the displacement mechanism 46, which includes a pneumatic actuator sliding along a dispenser rail 70 actuated with air via pneumatic tubing 72. The cup 34 is magnetically attracted to the plate 36 to form a tight seal.

The plate 36 includes an etched channel 68 which is shaped so that a particular portion of the upper carrier part 14.1 is covered in glue when the second gripper 30 places said particular portion in the channel 68. By displacing the glue cup 34 across the plate 36, a layer of glue is deposited on the plate and collects in the channel 68. The apparatus 32 is controlled by the controller or control system described below.

Figure 6:
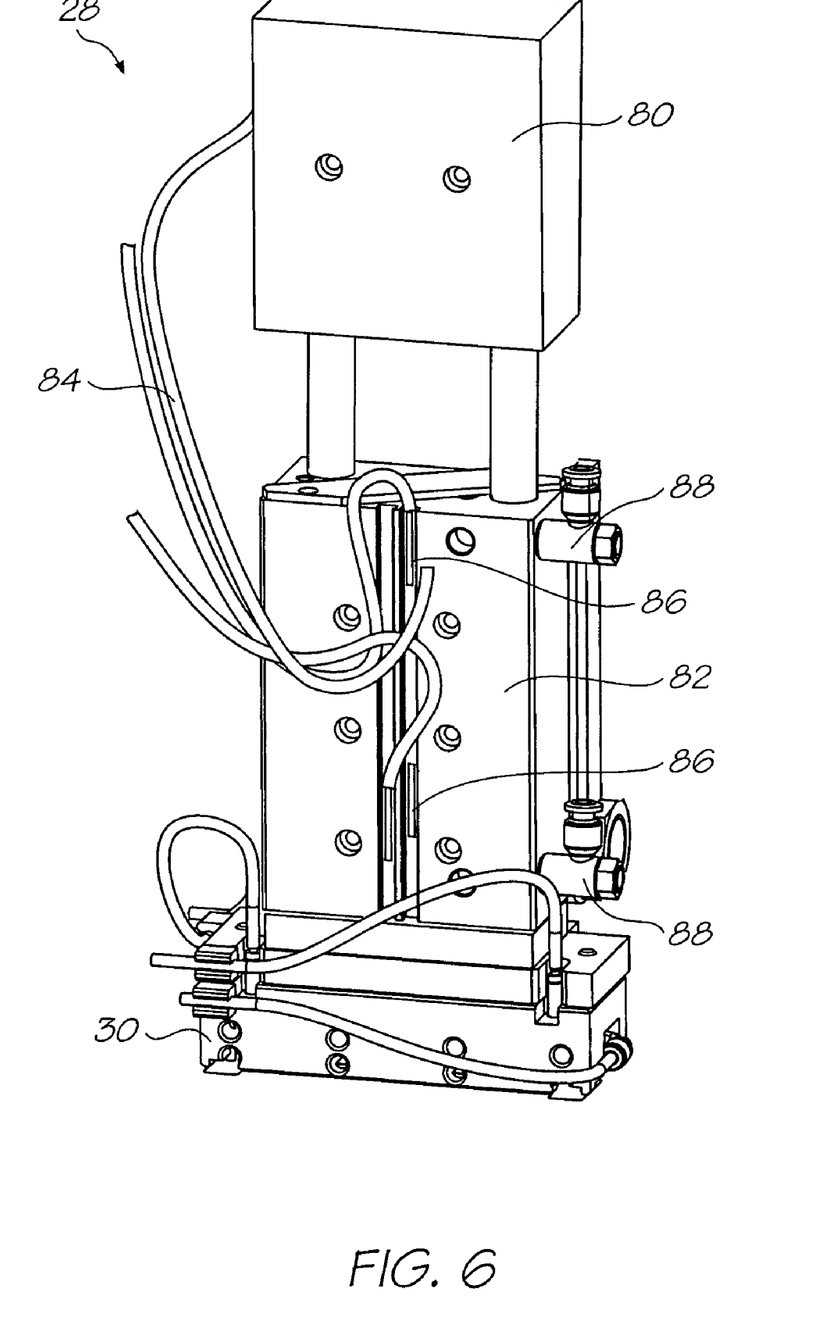
FIG. 6 shows a perspective view of a displacement mechanism of the assembler shown in FIG. 1.

The displacement mechanism 28 is shown in more detail in FIG. 6. The mechanism 28 is used to dip the upper carrier part 14.1 onto the etched plate 36 of the glue dispenser 32, and subsequently to place the upper part 14.1 onto the lower carrier part 14.2 held in the bottom clamp nest 12.

The mechanism 28 has a micro-motor housing 80 housing a micro-motor to raise and lower the second gripper 30. This motor can include a DC motor with precision screw mechanism to gently place and lift the carrier part 14.1 onto the etched plate 36. The mechanism 28 can be configured to lift the carrier part 14.1 with an initial relatively slow movement to prevent "stringing" of the adhesive. The Inventor has found that the Maxon® 24V DC motor from the F2140 range is suitable for this application. The motor typically includes safety switches to interrupt power to the mechanism 28 if it exceeds its normal extent of travel. The Inventor has found that two Cherry® sub-miniature DC1C-C3LC sealed switches are adequate for this purpose.

The mechanism 28 also has actuator cylinders 82 to actuate the second gripper 30. The cylinders 82 are connected to pneumatic components under control of the controller via pneumatic connections 88. The cylinders 82 include position sensors 86 to sense the position of the mechanism 28, which is relayed to the controller via wires 84.

Figure 7:
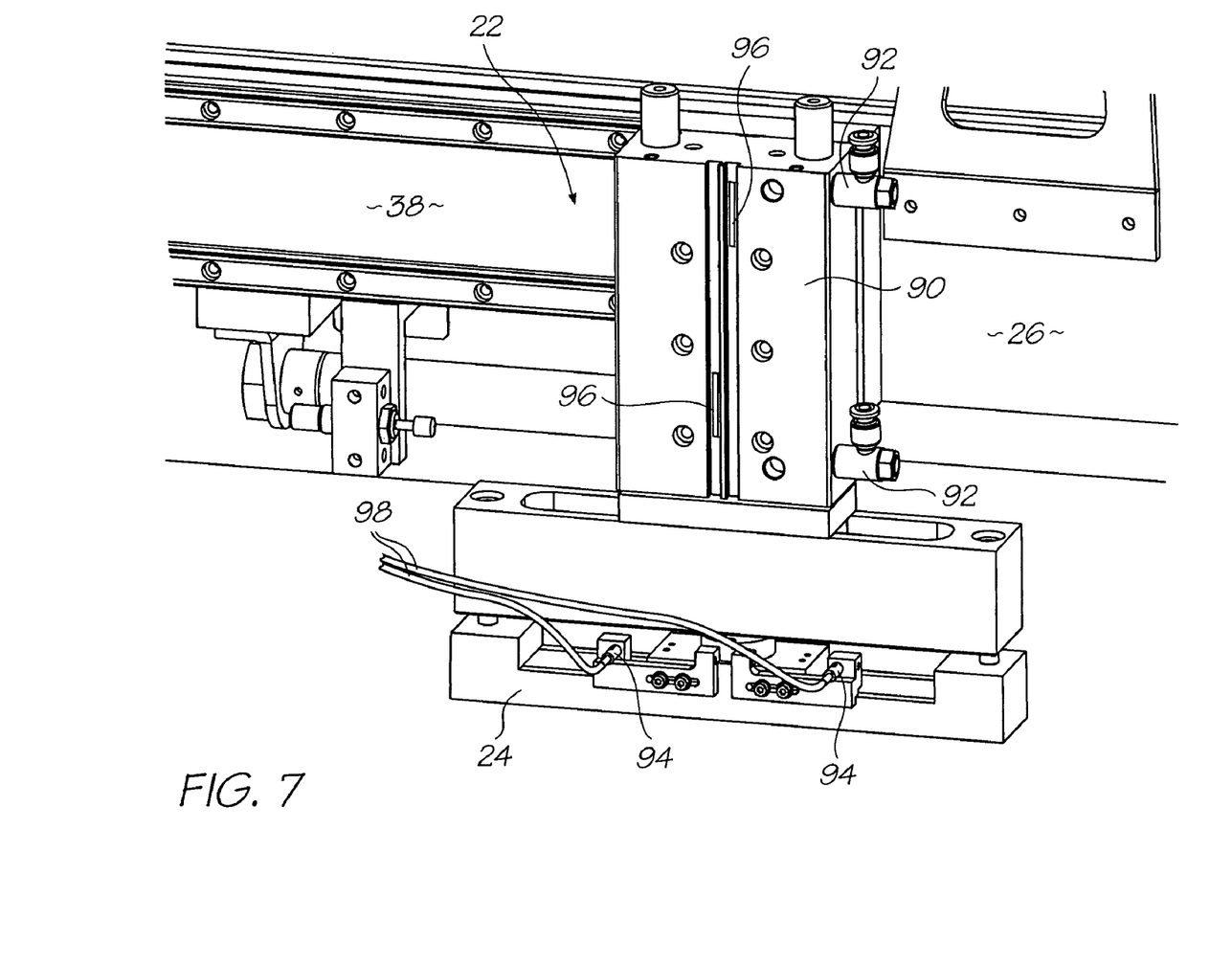
FIG. 7 shows a perspective view of an upper clamp lifting and holding mechanism of the assembler shown in FIG. 1.

A more detailed view of the holding mechanism 22 is shown in FIG. 7. The mechanism 22 includes the first gripper 24 and is attached to the rail 38 of the carriage assembly 26. Actuator cylinders 90 are controlled by the controller to actuate the first gripper 24 to retrieve and place the top clamp onto the bottom clamp. The cylinders 90 are pneumatically operated via pneumatic connections 92. The cylinders 90 can include a load cell (not shown) for measuring the amount of pressure applied when the top clamp is placed or pressed onto the bottom clamp. It is to be appreciated that the mechanism 22 generally applies a predetermined amount of pressure to clamp the clamps 20 together.

Accordingly, the first gripper 24 includes clamp lock proximity sensors 94 configured to determine when the clamps 20 are locked together. Typically, the clamps 20 have locking levers which are displaced proximate these sensors 94 when said clamps 20 are locked together. The sensors 94 are operatively linked to the controller via wires 98. The cylinders 90 can also include position sensors 96 to sense and relay the position of the mechanism 22 to the controller.

Figure 81:
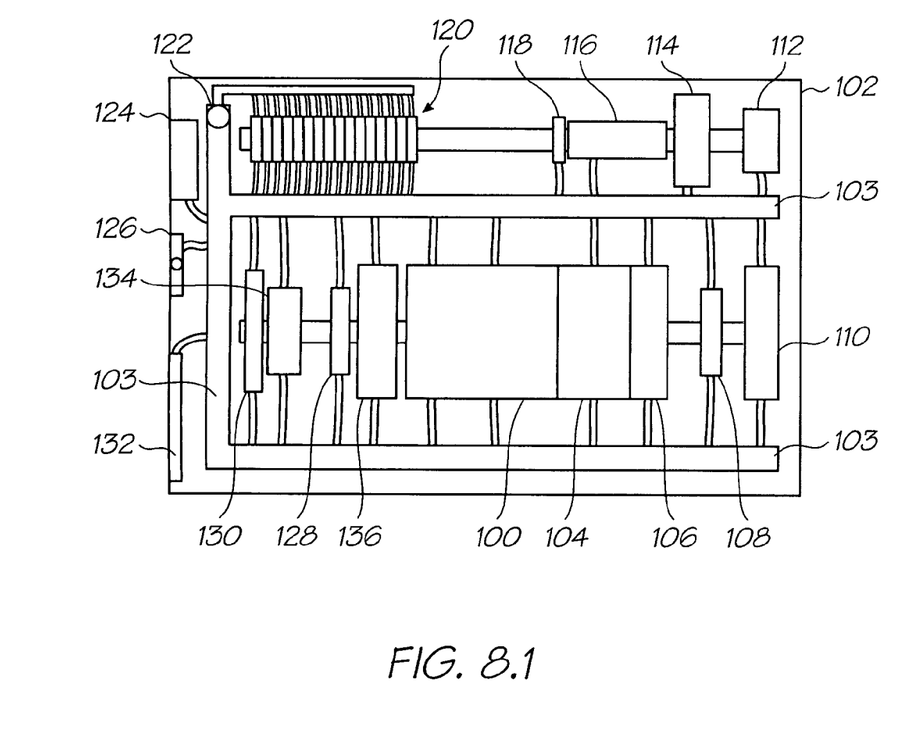

An embodiment of the controller 100 is shown in FIG. 8, housed in an enclosure 102 of the assembler 10. The enclosure 102 houses the required electrical and pneumatic components for operating the assembler 12. The controller 100 includes a programmable logic controller (PLC). The Inventor has found that the Mitsubishi FX3U-48MR PLC is suitable. The PLC generally includes an RS232 interface module (Mitsubishi FX3U-232BD), and Ethernet interface module 104 (Mitsubishi FX3U-ENET) and a 2-channel analog function module (Mitsubishi FX3U-2AD).

The RS232 module is used to perform data transfer between the PLC 100 and the barcode scanner 44. The RS232 module may also be used to upgrade PLC software via an 8-way DIN connector. In general, the RS232 module is used to connect the PLC 100 with the display panel 40. A Monitouch® V606eC20 display has been found to be suitable, as it offers a 16-colour 320×240 dots display incorporating an analog switch and a SRAM/built-in clock function. The Ethernet interface module 104 is used to connect the controller or PLC 100 to a remote monitoring system. The analog function module is used to convert analog measurements from the load cell in the holding mechanism 22 into digital signals for interpretation by the controller 100.

The assembler 10 includes two DC power supply modules 110 and 116 for supplying the PLC 100 and related components, along with a motor controller 114 and solenoid components discussed below, respectively with power. The Inventor has found that the Phoenix Contact MINI-PS-100-240AC/24DC/4 and MINI-PS-100-240AC/5DC/3, respectively, are suitable for the application.

The assembler 10 has a safety system, in accordance with an embodiment of the invention. The safety system includes an emergency cut off mechanism having two safety relays 134 in the form of a primary safety relay and a relay for a light curtain 150 (shown in FIG. 1) of the safety system discussed in more detail below. The Inventor has found that the Wieland SNO 4003K Safety Relay is adequate for the primary relay, with the Omron G7S-4A2B DC24 Plug-In Safety Relay appropriate for the light curtain relay. A flare relay 108 is also included between the power supply 110 and the PLC 100, in the form of a Wieland 24V DC terminal relay.

A signal conditioning unit 106 is included which provides signal conditioning for the load cell in the holding mechanism 22. Gain selection and gross offset correction are allowed by this unit to match load cell signals to input requirements of the PLC 100. An Applied Measurement RM044 unit has been found to be appropriate.

Overcurrent and earth leakage protection are provided by a Hager AD 810T residual current circuit breaker 130. The unit 130 is a single pole unit with a switched neutral to detect sinusoidal residual current, and offers earth fault detection and incorporates a trip free mechanism.

Ventilation and cooling for the enclosure 102 is provided by a Sunon 24V DC brushless fan 132. The fan unit 132 can include a filter to keep dust out of the enclosure 102.

The light curtain 150 forms a sensor arrangement and comprises transmitter and receiver units located on opposite sides of the support structure 16 to create an invisible light curtain between the sides. The safety system, forming part of the control system includes a light curtain controller 136 that is configured to shut the assembler 10 down when a foreign object pierces the light curtain. The Inventor has found that a Keyence® SL-C32H Light Curtain is able to fulfill this task. The light curtain 150 is configured to interrupt electrical power and to release air pressure in the pneumatic components when a foreign object is detected.

The controller 100 is configured to regulate and control the pneumatic components such as the grippers 24 and 30, the carriage 26, the glue dispenser 32, the mechanisms 22 and 28. To this end, and for safety purposes, the enclosure 102 includes solenoid valves 120 and 112, pressure sensor 122, and isolation valve 126. For electrical protection, a number of fuses 118 and 128 are also included, as shown.

Figure 82:
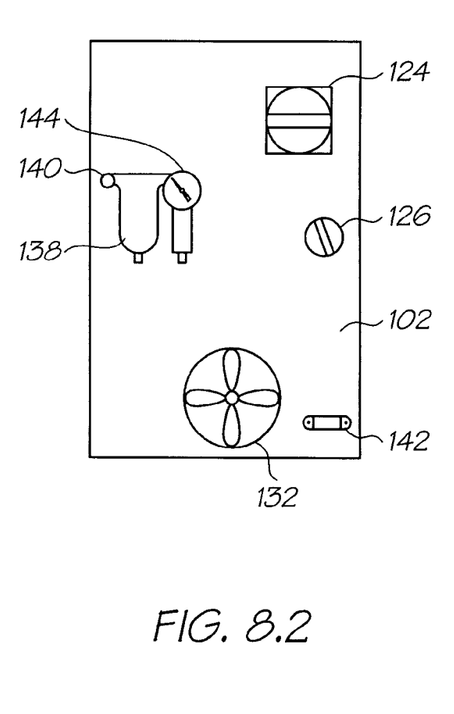

A side view of the enclosure 102 of FIG. 8.1 is shown in FIG. 8.2. An air connector 140 is shown via which the assembler 10 is connected to an air supply for the pneumatic components controlled by the controller 100. The connector 140 includes a pressure regulator 144 and the air supply isolation valve 126 can be seen. The pneumatic connector 140 includes a micro-mist separator to trap and drain moisture from an incoming air supply. A main AC power isolation switch 124 is also included.

As discussed above, the clamps 20 are shown in more detail in FIG. 9. The lower clamp 20.1 includes a bottom bar 151 with a silicone sheet 152, which is attached to the bottom bar 151 by means of a rubber retainer 156 and retainer screws 158. Dowel pins 154 are also included, as shown. Clamp pins 160 are affixed to bottom bar 151 by means of pin nuts 162.

Accordingly, top clamp 20.2 has a top bar 164 having a glass layer 166 attached to the bar 164 by means of glass clips 168 and clip screws 170. Clamp pin latches 172 operatively receive the clamp pins 160, whereafter the second gripper 30 displaces dowel pins 174 outwards to lock the clamps 20 together. The top clamp 20.2 further includes cover 176 and cover screws attaching said cover 176 to the top bar 164, as shown.

Figure 10:
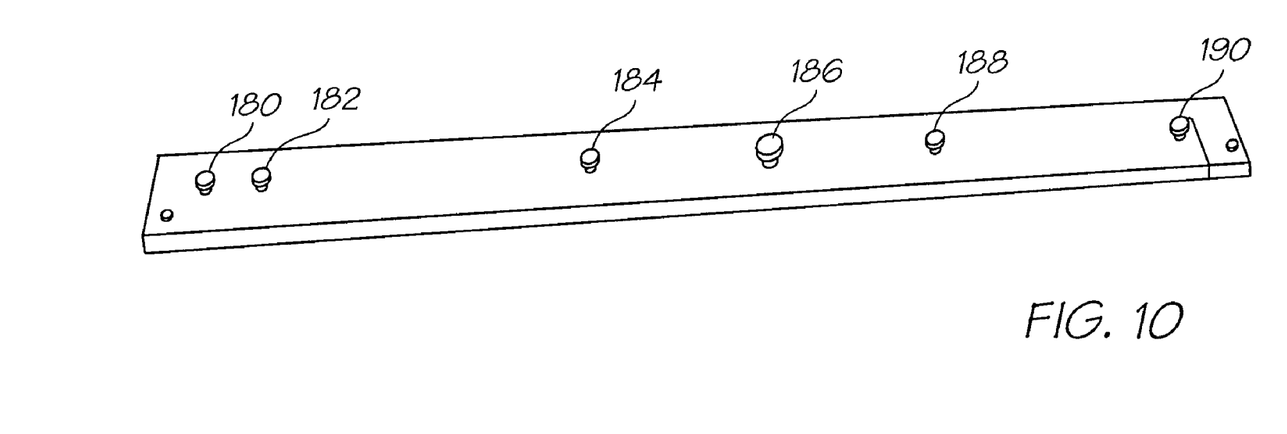
FIG. 10 shows an embodiment of a user interface for the assembler of FIG. 1.
Figure 11:
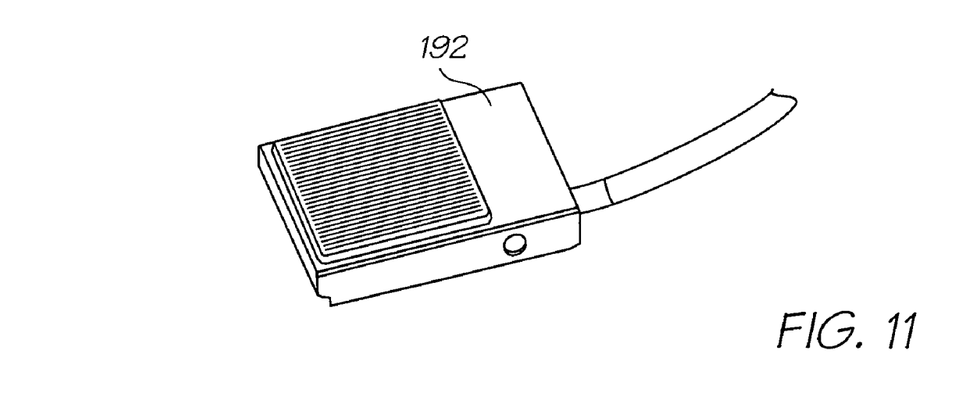
FIG. 11 shows an embodiment of a foot switch forming part of a user interface for the assembler of FIG. 1.

FIGS. 10 and 11 show embodiments of the user interface panel 42 and a foot switch 192. The interface panel 42 includes a wipe button 180 which is connected to the PLC 100 such that, on actuation, the controller to displace the adhesive dispenser mechanism 34 across the etched plate 36 to wipe excess glue from the plate 36. A reset button 182 is also provided which resets the assembler 10 to a ready state. The interface 42 includes two start buttons 184 and 188 as a safety feature. Both these buttons 184 and 188 must be pressed simultaneously to activate the assembler 10. An emergency stop button 186 is also included, along with a scanner connection 190 for connecting the scanner 44 to the PLC 100.

In the embodiment shown, the foot switch 192 is used to instruct the PLC 100 so that the upper carrier part 14.1 is gripped in the second gripper 30, which frees up the operator's hands for the interface panel and touch screen display 40.

Figure 12:
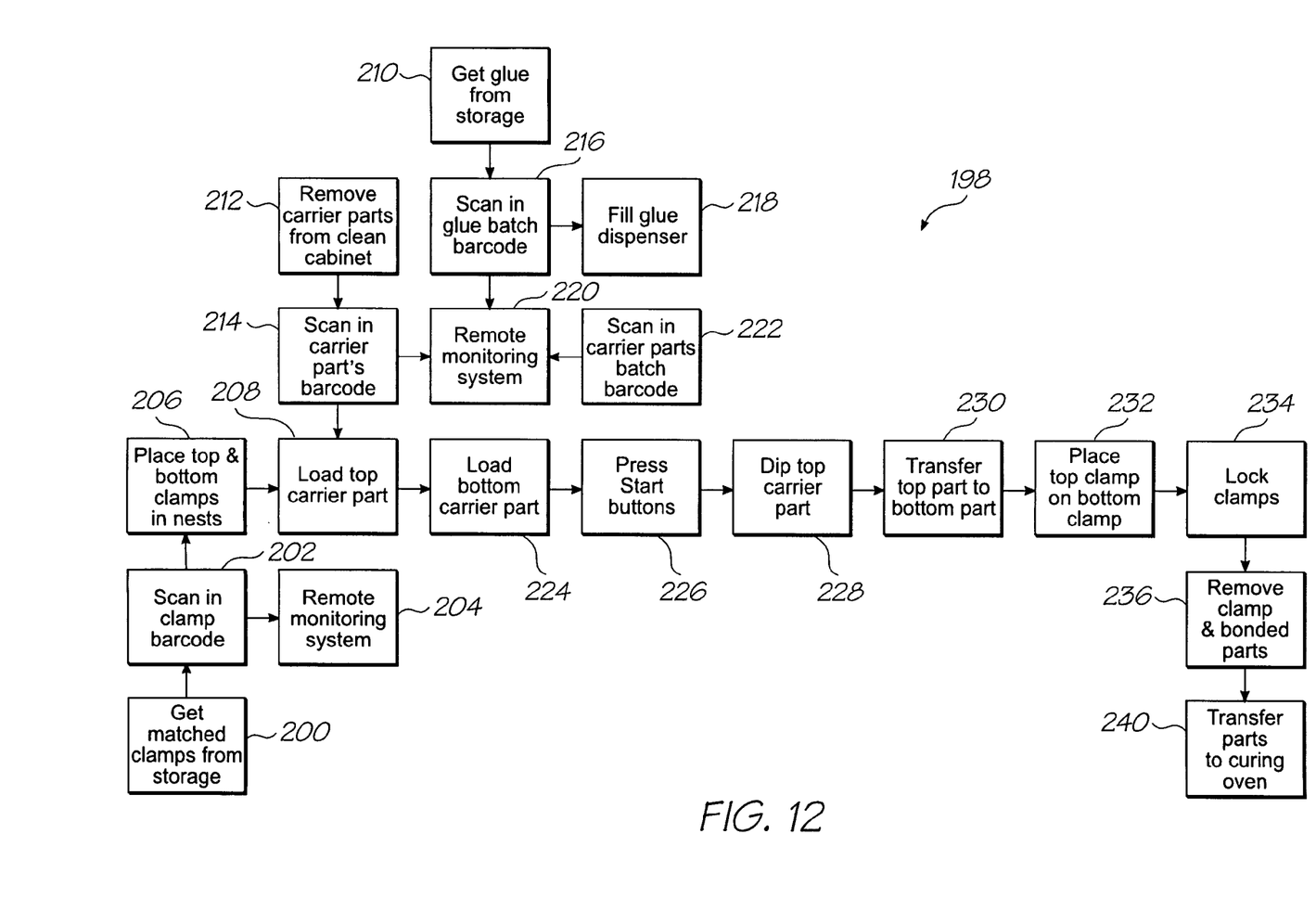
FIG. 12 shows a flow diagram representing a method, in accordance with the invention, for assembling the carrier for integrated circuits.

The invention extends to a method 198 for assembling the carrier or carrier 14 for the printhead circuitry. An overview of these method steps are shown in FIG. 12, individual steps generally represented by the blocks referenced from numeral 200 to 240.

Blocks 204 and 220 refer to steps generally performed by the PLC 100 transmitting data via the Ethernet module 104 to the remote monitoring system, such as a control network linked to a production or testing assembly, or the like. Steps indicated by blocks 200, 202, 206, 208, 214, 212, 210, 216, 218, 222, 224, 226, 236 and 240 are generally performed by the operator. Blocks 228, 230, 232 and 234 represent steps typically performed by the assembler 10 under control of the operator.

In preparation of bonding the carrier parts 14 together, the operator typically commences the process 198 by retrieving the clamps 20 from storage, as indicated by block 200. The barcode scanner 44 is used to scan barcodes of the clamps (shown by block 202), and these barcodes are sent to the remote monitoring system during block 204.

The clamps 20 are then placed in their respective clamp nests 12 and 18 located on the support bed 16 of the assembler 10. Similarly, the carrier parts 14 are removed from a clean storage environment (shown in block 212) and their barcodes are scanned in block 214, data representing the barcodes being communicated to the remote monitoring system in block 220. The method can include the step of scanning a batch barcode (block 222) of the parts and communicating data representing the batch barcode to the remote monitoring system. The carrier parts 14 are loaded by placing the top carrier part 14.1 into the second gripper 30, and placing the bottom carrier part 14.2 into the bottom clamp 20.1 in the bottom clamp nest 12 (blocks 208 and 224, respectively).

In anticipation of the bonding process, it might be necessary to fill the glue cup 34 with glue prior to bonding. This process is shown by blocks 210 (retrieving the glue), 216 (scanning a barcode of the glue batch), and 218 (filling the glue cup). Once the above steps have been completed, where necessary, the operator can press the start buttons 184 and 188 (block 226) on the panel 42 to commence a process performed by the assembler 10.

The PLC 100 then manages the steps of dipping the upper carrier part 14.1 in the glue dispensed on the plate 36, and placing the upper part 14.2 on the bottom part 14.2 (blocks 228 and 230, respectively). The top clamp 20.2 is retrieved by the first gripper 24, and pressed onto the bottom clamp 20.1 (block 232). The mechanism 22 then locks the clamps 20 together, as described above, shown in block 234.

The operator is then able to remove the bonded and clamped assembly (block 236) from the bottom clamp nest 12, whereafter it can be transferred to a curing oven (block 240).

As mentioned above, the assembler 10 includes a safety system represented by the respective sensors, described above, and the light curtain 150 as controlled by the PLC 100. The safety system monitors an operating zone within the support structure 16, generally as demarcated by the light curtain 150. If a foreign object is sensed by the light curtain, or any sensor senses an undesired position of a mechanism, the PLC 100 deactivates the assembler 10.

Accordingly, the PLC 100 is configured to deactivate the assembler when any undesirable operational status, as monitored by the PLC 100, is detected. The PLC 100 generally monitors positions of the movable mechanisms, such as mechanisms 22 or 28, carriage 26, glue dispenser 32, gripper 24 and 30, etc. The fluid pressure of the pneumatic components, as described above, is also monitored. Similarly, the presence and correct placement of the carrier parts and clamps 20 in their respective nests or grippers can be monitored, along with the authenticity of the components as identified by their barcodes.

As discussed above, the PLC 100 also monitors the electricity supply to the assembler 10. In one embodiment, the operator may have to provide identification prior to operating the machine. This may include keying in a code via the display 40, or the like. Should any of the monitored aspects not be complied with, the PLC 100 can be programmed not to activate the assembler 10. Accordingly, the PLC 100 can be connected to any suitable sensors for monitoring the above aspects, such as pressure sensors, proximity sensors, etc.

The above examples are merely to guide the skilled person in implementing the invention, and are not meant to unduly restrict the scope thereof. It is to be appreciated that any reference to particular components specific to particular manufacturers does not limit the invention to the use of these components. As such, the skilled person will appreciate that similar functionality is achievable by different components or even different configurations without detracting from the scope of the invention.

The invention claimed is:

1. A method for assembling a carrier for integrated circuits, said carrier having upper and lower parts, the method comprising the steps of:
positioning the lower part in a bottom clamp portion retained in a bottom clamp receptacle;
positioning a top clamp portion in a top clamp receptacle, the clamp portions being configured to engage each other in a locking manner;
positioning the upper part in a first gripper;
applying adhesive to at least one of the parts;

pressing said upper part onto the bottom part retained by the bottom clamp receptacle with the first gripper, whilst retrieving the top clamp portion with a second gripper; and locking the top clamp portion to the bottom clamp portion with the second gripper to clamp the parts together.

2. A method as claimed in claim 1, wherein the step of positioning the carrier parts includes positioning carrier parts molded from a liquid crystal polymer (LCP).

3. A method as claimed in claim 1, wherein the step of positioning the carrier parts includes receiving carrier parts which define a plurality of discrete fluid paths when operatively joined to form a fluid supply carrier for the printhead circuitry.

4. A method as claimed in claim 1, wherein the step of applying adhesive includes dispensing the adhesive with an adhesive dispenser onto a surface and dipping at least part of the gripped upper part in such dispensed adhesive with said first gripper.

5. A method as claimed in claim 1, carried out with an apparatus that defines a single-user station and including the step of monitoring an operational status of the apparatus.

6. A method as claimed in claim 5, including the step of reading identifiers on the carrier parts and relaying data representing the identifiers to a control system of the apparatus.

* * * * *